United States Patent
Cao et al.

(10) Patent No.: US 10,089,549 B1
(45) Date of Patent: Oct. 2, 2018

(54) VALLEY SEARCH METHOD FOR ESTIMATING EGO-MOTION OF A CAMERA FROM VIDEOS

(71) Applicant: HRL Laboratories, LLC, Malibu, CA (US)

(72) Inventors: Yongqiang Cao, Newton, MA (US); Narayan Srinivasa, Portland, OR (US)

(73) Assignee: HRL Laboratories, LLC, Malibu, CA (US)

( * ) Notice: Subject to any disclaimer, the term of this patent is extended or adjusted under 35 U.S.C. 154(b) by 0 days.

(21) Appl. No.: 15/584,986

(22) Filed: May 2, 2017

Related U.S. Application Data

(63) Continuation-in-part of application No. 15/250,665, filed on Aug. 29, 2016.

(Continued)

(51) Int. Cl.
  *G06T 7/20* (2017.01)
  *G06K 9/32* (2006.01)
  (Continued)

(52) U.S. Cl.
  CPC .......... *G06K 9/3241* (2013.01); *G06F 17/11* (2013.01); *G06K 9/209* (2013.01); *G06K 9/48* (2013.01);
  (Continued)

(58) Field of Classification Search
  CPC .. G06T 7/20; G06T 7/254; G06T 7/70; G06T 7/97; G06K 9/00624; G06K 9/0063; G06K 9/00711; G06K 9/00771
  See application file for complete search history.

(56) References Cited

U.S. PATENT DOCUMENTS 7,227,893 B1 * 6/2007 Srinivasa et al. ........ 375/240.08
2016/0307334 A1 * 10/2016 Dos Santos Mendonca ...............
  G06T 7/2033
(Continued)

OTHER PUBLICATIONS del-Blanco, C. R., Jaureguizar, F., Salgado, L., & Garcia, N. (2008). Motion estimation through efficient matching of a reduced number of reliable singular points. In Electronic Imaging 2008, pp. 68110N 1-12.

(Continued)

*Primary Examiner* — Andrew W Johns
(74) *Attorney, Agent, or Firm* — Tope-McKay & Associates

(57) ABSTRACT

Described is a system for estimating ego-motion of a moving camera for detection of independent moving objects in a scene. For consecutive frames in a video captured by a moving camera, a first ego-translation estimate is determined between the consecutive frames from a first local minimum. From a second local minimum, a second ego-translation estimate is determined. If the first ego-translation estimate is equivalent to the second ego-translation estimate, the second ego-translation estimate is output as the optimal solution. Otherwise, a cost function is minimized to determine an optimal translation until the first ego-translation estimate is equivalent to the second ego-translation estimate, and an optimal solution is output. Ego-motion of the camera is estimated using the optimal solution, and independent moving objects are detected in the scene.

21 Claims, 11 Drawing Sheets
(2 of 11 Drawing Sheet(s) Filed in Color)

Related U.S. Application Data

(60) Provisional application No. 62/210,630, filed on Aug. 27, 2015, provisional application No. 62/330,462, filed on May 2, 2016.

(51) Int. Cl.
  *G06K 9/20* (2006.01)
  *G06F 17/11* (2006.01)
  *G06T 7/215* (2017.01)
  *G06K 9/48* (2006.01)

(52) U.S. Cl.
  CPC ........ *G06K 2009/484* (2013.01); *G06T 7/215* (2017.01)

(56) References Cited

U.S. PATENT DOCUMENTS

2017/0277197 A1* 9/2017 Liao et al. ............ G05D 1/0251
2017/0309034 A1* 10/2017 Mueller .................. G06T 7/248

OTHER PUBLICATIONS

Bruss, A. R., & Horn, B. K. (1983). Passive navigation. Computer Vision, Graphics, and Image Processing, 21(1), pp. 3-20.

Cheng, Y., Maimone, M., & Matthies, L. (2005). Visual odometry on the Mars exploration rovers. In IEEE International Conference on Systems, Man and Cybernetics, 2005, vol. 1, pp. 903-910.

Fischler, M. A., & Bolles, R. C. (1981). Random sample consensus: a paradigm for model fitting with applications to image analysis and automated cartography. Communications of the ACM, 24(6), pp. 381-395.

Horn, B. K., & Schunck, B. G. (1981). Determining optical flow. In 1981 Technical Symposium East International Society for Optics and Photonics, pp. 319-331.

Lucas, B. D., & Kanade, T. (1981). An iterative image registration technique with an application to stereo vision. In IJCAI, vol. 81, pp. 674-679.

Ren, X. (2008). Local grouping for optical flow. In IEEE Conference on Computer Vision and Pattern Recognition, 2008, CVPR'08, pp. 1-8.

Tian, T. Y., Tomasi, C., & Heeger, D. J. (1996). Comparison of approaches to egomotion computation. In IEEE Conference on Computer Vision and Pattern Recognition, 1996, CVPR'96, pp. 315-320.

N. Srinivasa et al., "Probabilistic inference devices for unconventional processing of signals for intelligent data exploitation," in Proc. GOMACTech 2015, Mar. 2015, pp. 1-31.

H. Badino and T. Kanade, "A Head-Wearable Short-Baseline Stereo System for the Simultaneous Estimation of Structure and Motion," in Proc. 12th IAPR Conference on Machine Vision Applications (MVA), Jun. 2011, pp. 1-5.

Y. Cheng, M. Maimone, and L. Matthies, "Visual odometry on the Mars exploration rovers," in IEEE International Conference on Systems, Man and Cybernetics, vol. 1, pp. 903-910, 2005.

C.R. del-Blanco, F. Jaureguizar, L. Salgado, and N. Garcia, "Motion estimation through efficient matching of a reduced number of reliable singular points," in Proc. SPIE Electronic Imaging 2008, vol. 6811, pp. 68110N 1-12, 2008.

B.K. Horn and B.G. Schunck, "Determining optical flow," Artificial Intelligence, vol. 17, pp. 185-203, 1981.

B.D. Lucas and T. Kanade, "An iterative image registration technique with an application to stereo vision," in Proc. 7th International Joint Conference on Artificial Intelligence (IJCAI), vol. 81, pp. 674-679, 1981.

K. Ren, "Local grouping for optical flow," in Proc. IEEE Conference on Computer Vision and Pattern Recognition (CVPR'08), 2008, pp. 1-8.

M.A. Fischler and R.C. Bolles, "Random sample consensus: a paradigm for model fitting with applications to image analysis and automated cartography," Communications of the ACM, vol. 24, No. 6, pp. 381-395, 1981.

L. Itti, Neovision2 annotated video datasets. Taken on Jun. 15, 2017 from h t t p : / / ilab.usc.edu/neo2/dataset/.

\* cited by examiner

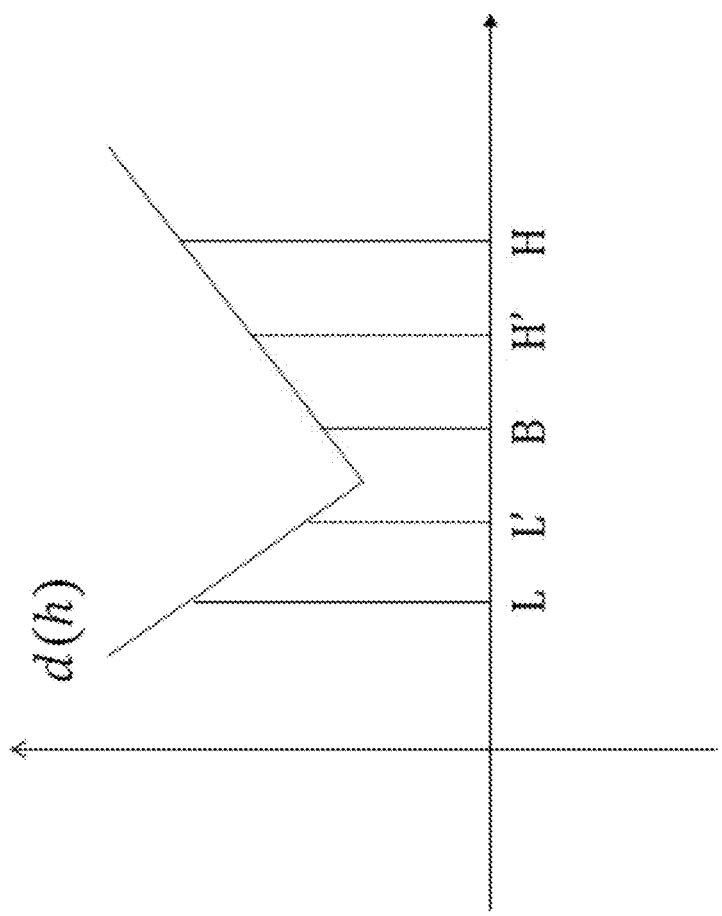

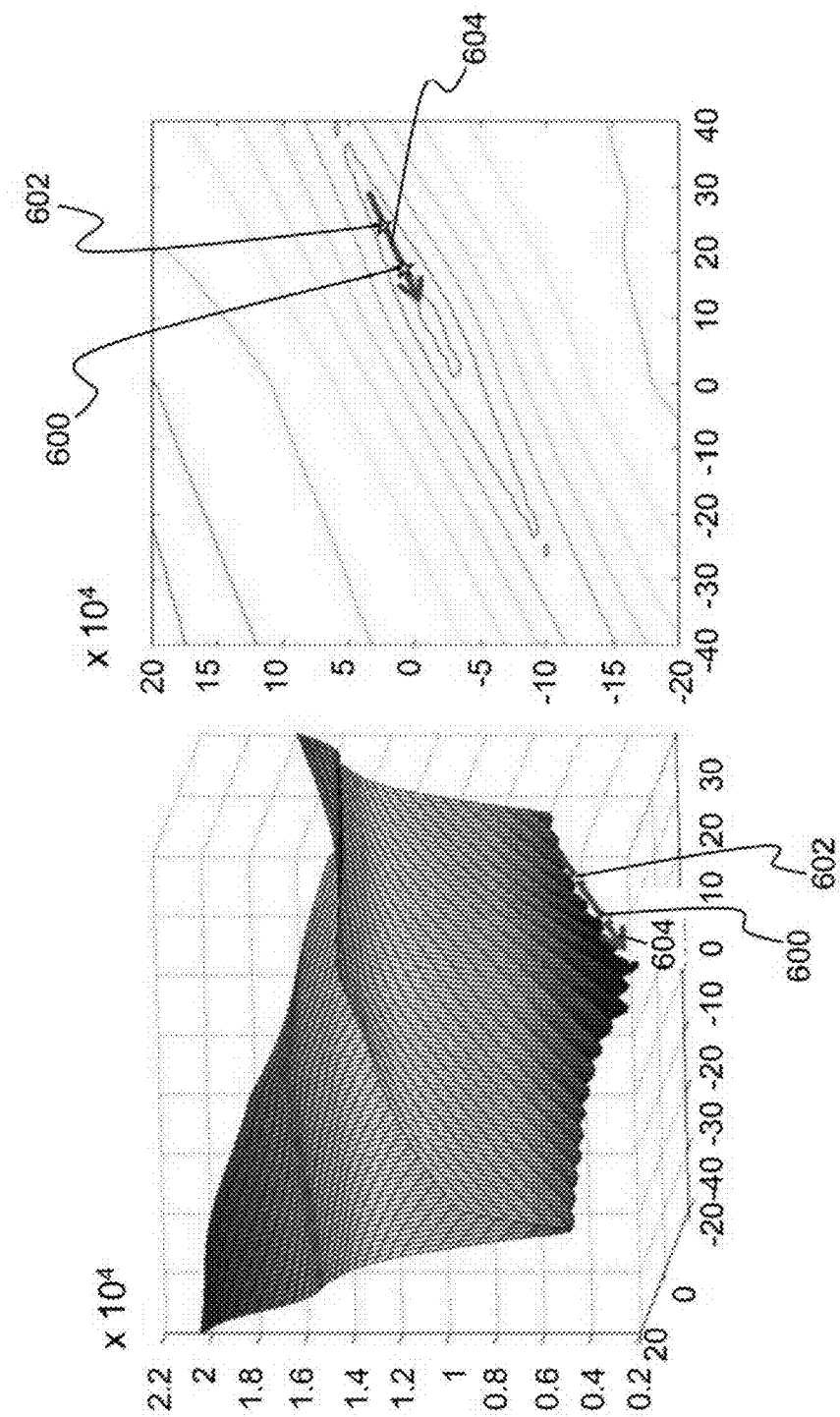

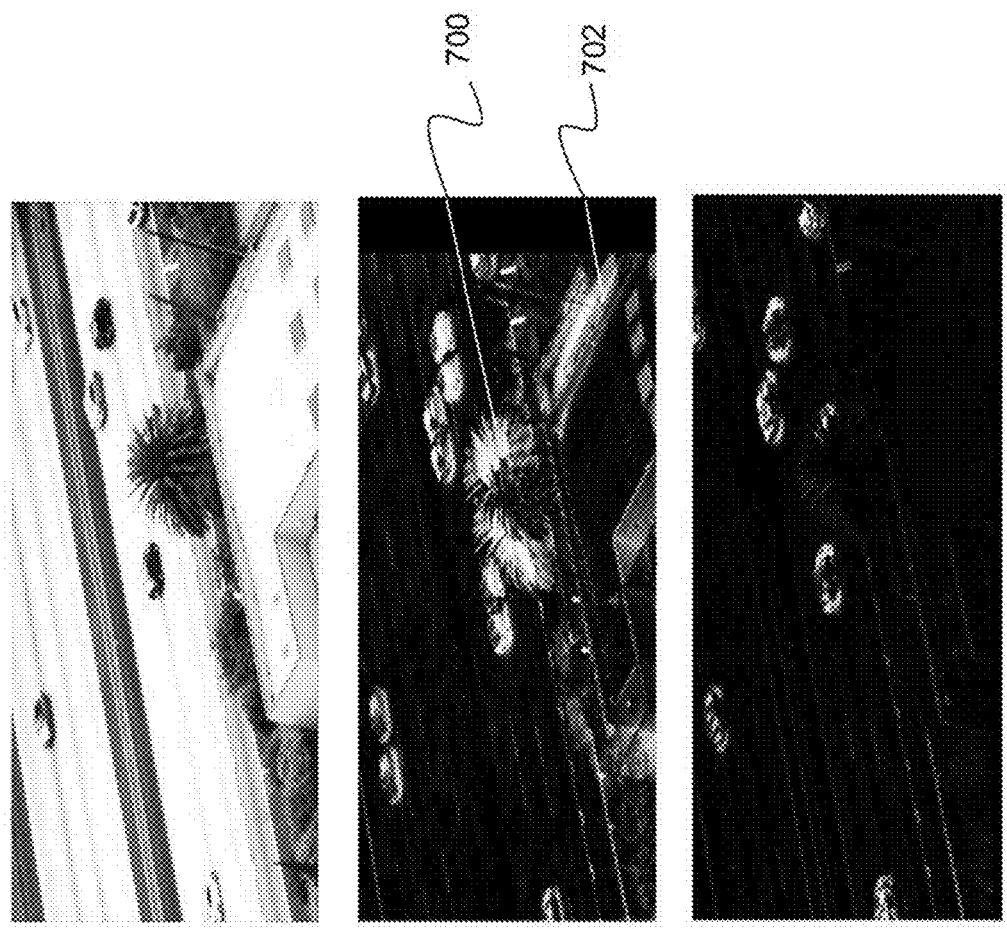

VALLEY SEARCH METHOD FOR ESTIMATING EGO-MOTION OF A CAMERA FROM VIDEOS

CROSS-REFERENCE TO RELATED APPLICATIONS

This is a Continuation-in-Part patent application of U.S. application Ser. No. 15/250,665, filed in the United States on Aug. 29, 2016, entitled, "A Fast Robust Method for Compensating Ego-Translations and Detecting Independent Moving Objects in Video Captured with a Moving Camera," which is a Non-Provisional patent application of U.S. Provisional Application No. 62/210,630, filed in the United States on Aug. 27, 2015, entitled, "A Fast and Robust Method for Compensating Ego-Translations and Detecting Independent Moving Objects in Video Captured with a Moving Camera," the entirety of which are hereby incorporated by reference.

This is ALSO a Non-Provisional patent application of U.S. Provisional Application No. 62/330,462, filed in the United States on May 2, 2016, entitled, "A Valley Search Method for Estimating Ego-Motion of a Camera from Videos," the entirety of which is hereby incorporated by reference.

STATEMENT REGARDING FEDERALLY SPONSORED RESEARCH OR DEVELOPMENT

This invention was made with government support under U.S. Government Contract Number HR0011-13-C-0052. The government has certain rights in the invention.

BACKGROUND OF INVENTION

(1) Field of Invention

The present invention relates to a system for estimating ego-motion for a video scene and, more particularly, to a system for estimating ego-motion for a video scene having remarkable periodic features.

(2) Description of Related Art

With the advent of modern computers, sensors, and the internet, the amount of data being collected is far outpacing current capabilities of computing platforms to process them. This is further exacerbated for intelligence, reconnaissance and surveillance (ISR) applications where there is also a need for real-time processing of the large volume of data collected from computers on aerial vehicles, such as unmanned aerial vehicles (UAVs), helicopters, airplanes, and satellites to enable fast situational awareness and response capabilities.

Additionally, emerging low-power devices require fast and robust algorithms for on-board real-time processing of high-resolution video imagery captured from aerial vehicles to perform target recognition and tracking over large numbers of objects. A key requirement for video processing from aerial vehicles is the need to compensate ego-motion of the vehicle in order to robustly detect all of the independent moving objects in the scene. Prevalent methods of estimating the ego-motion of a camera require complex computation and are, hence, not suitable for the emerging low-power devices.

Thus, a continuing need exists for a system that can be used for real-time processing of wide-area, high-resolution video imagery to performing target recognition and tracking over large numbers of moving objects.

SUMMARY OF INVENTION

The present invention relates to a system for estimating ego-motion for a video scene and, more particularly, to a system for estimating ego-motion for a video scene having remarkable periodic features. The system comprises one or more processors and a non-transitory computer-readable medium having executable instructions encoded thereon such that when executed, the one or more processors perform multiple operations. For consecutive frames in a video captured by a moving camera, the system determines a first ego-translation estimate between the consecutive frames from a first local minimum $(h_0, v_0)$. A second ego-translation estimate is determined from a second local minimum $(h'_0, v'_0)$. If the second ego-translation estimate does not equal the first ego-translation estimate, the system determines an optimal solution by minimizing a cost function until the first ego-translation estimate and the second ego-translation estimate are a matching estimate. Ego-motion of the camera is estimated using the optimal solution. Finally, the system detects independent moving objects in the video after compensating for ego-motion of the camera.

In another aspect, the cost function to be minimized is $f(h,v) = \Sigma_{ij} |I'(i+h, j+v) - I(i,j)|$, where $|\cdot|$ is an absolute value, $(i,j)$ are pixel positions in an overlapping region of consecutive frames I and I', h represents a horizontal shift between I and I', and v represents a vertical shift between I and I'.

In another aspect, the first ego-translation $(h_1, v_1)$ and the second ego-translation $(h_2, v_2)$ are determined using an alternate line search method according to the following: determining $h_1$ such that $$\min_h f(h, v_0) \text{ at } h = h_1;$$

at $h = h_1$; determining $v_1$ such that $$\min_v f(h_1, v) \text{ at } v = v_1; \text{ let } \Delta h = |h_1 - h_0|,$$

at $v = v_1$; let $\Delta h = |h_1 - h_0|$, $\Delta v = |v_1 - v_0|$, then resetting $h_0 \leftarrow h_1$ and $v_0 \leftarrow v_1$, wherein $\Delta h = |h_1 - h_0|$ represents a difference between initial horizontal pixel values in an initial frame $h_0$ and shifted horizontal pixel values in a consecutive frame $h_1$, and wherein $\Delta v = |v_1 - v_0|$ represents a difference between initial vertical pixel values in an initial frame $v_0$ and shifted vertical pixel values in a consecutive frame $v_1$ and repeating (a) through (c) until $\Delta h$ and $\Delta v$ are zeros or less than one pixel.

In another aspect, the system determines $d(u) = f(x_0 + ru)$, where d is a function to be minimized and u is a normalized value, and where $r = (h_2 - h_1, v_2 - v_1)$, and $x_0 = (h_1, v_1)$. A line search method is performed to function d such that that $\alpha = \text{linesearch}(d, \Delta, \varepsilon_1)$, where $\Delta = 1$ and $$\varepsilon_1 = \min\left(\left|\frac{1}{h_2 - h_1}\right|, \left|\frac{1}{v_2 - v_1}\right|\right).$$

The system uses an alternate line search method to determine an ego-translation estimate $(h',v')$ starting from $(h,v)$, wherein $(h,v) = \text{round}(x_0 + r\alpha)$, where the round function acts to round to a nearest whole number. Then, the system resets $(h_1, v_1) = (h_2, v_2)$ and $(h_2, v_2) = (h', v')$.

In another aspect, the cost function to be minimized is based on differences between initial pixel values in an initial frame and shifted pixel values in a consecutive frame.

In another aspect, the first ego-translation and the second ego-translation are determined using an alternate line search method.

In another aspect, the system performs a line search method to a function based on the first ego-translation estimate in combination with a scaled difference between the first ego-translation estimate and the second ego-translation estimate; uses an alternate line search method to determine a third ego-translation estimate by starting from a position determined using a round function; and resets the second ego-translation estimate equal to the results of the alternate line search method based on the third ego-translation estimate.

Finally, the present invention also includes a computer program product and a computer implemented method. The computer program product includes computer-readable instructions stored on a non-transitory computer-readable medium that are executable by a computer having one or more processors, such that upon execution of the instructions, the one or more processors perform the operations listed herein. Alternatively, the computer implemented method includes an act of causing a computer to execute such instructions and perform the resulting operations.

BRIEF DESCRIPTION OF THE DRAWINGS

The file of this patent or patent application publication contains at least one drawing executed in color. Copies of this patent or patent application publication with color drawing(s) will be provided by the Office upon request and payment of the necessary fee.

The objects, features and advantages of the present invention will be apparent from the following detailed descriptions of the various aspects of the invention in conjunction with reference to the following drawings, where:

FIG. 4 is an illustration of a line search algorithm according to some embodiments of the present disclosure;

FIG. 6A is an illustration of a valley search method depicted in a surface plot according to some embodiments of the present disclosure;

FIG. 6B is an illustration of a valley search method depicted in a contour plot according to some embodiments of the present disclosure;

FIG. 7A is an illustration of a video image frame in a helicopter video where the camera keeps changing its moving direction in high speed according to some embodiments of the present disclosure;

FIG. 7B is an illustration of a warped frame difference after compensating the ego-translation that is obtained using the alternate line search method according to some embodiments of the present disclosure;

FIG. 7C is an illustration of a warped frame difference after compensating the ego-translation that is obtained using the valley search method according to some embodiments of the present disclosure;

DETAILED DESCRIPTION

Figure 1:
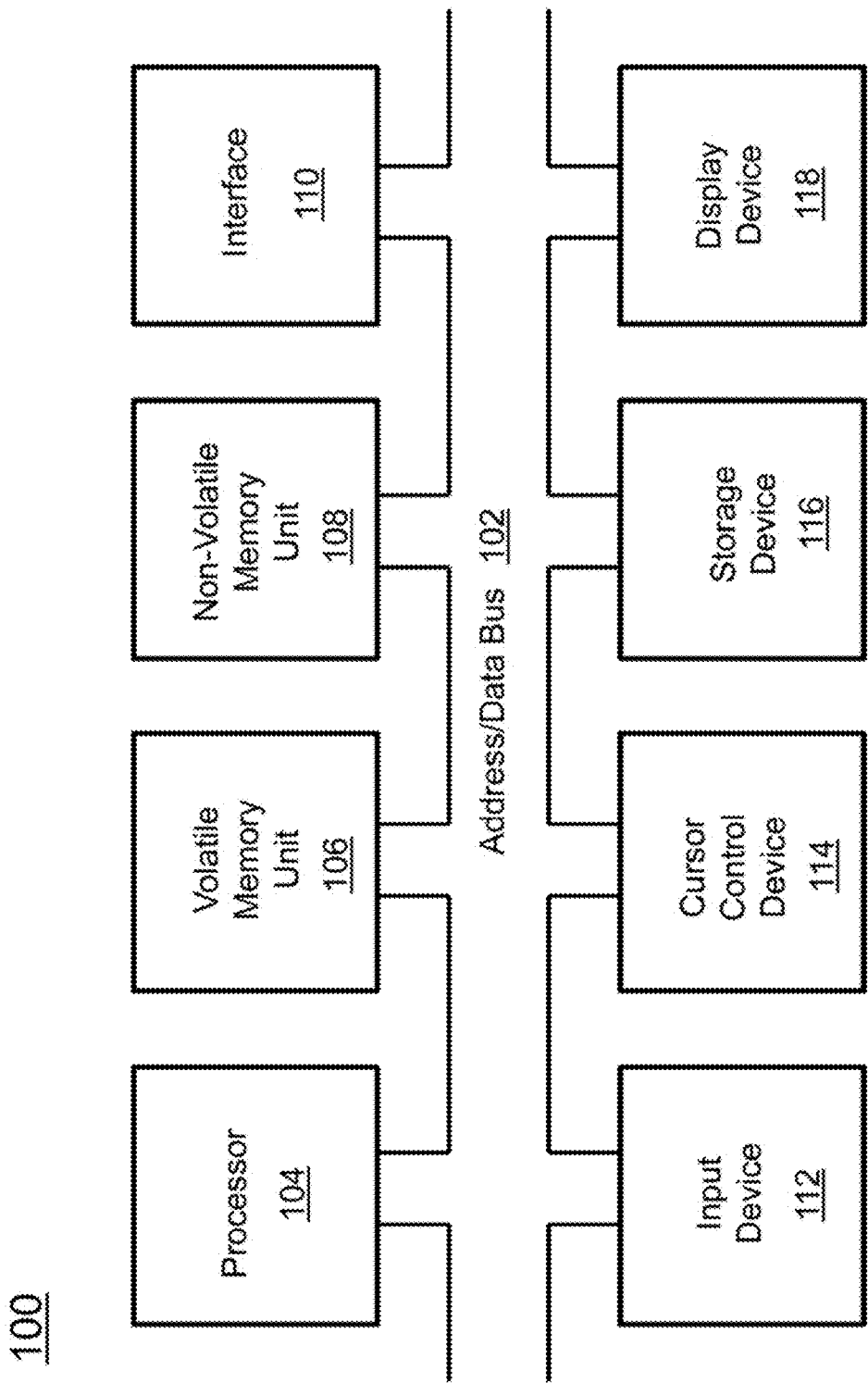
FIG. 1 is a block diagram depicting the components of a system for estimating ego-motion of a video scene according to some embodiments of the present disclosure.

The present invention relates to a system for estimating ego-motion for a video scene and, more particularly, to a system for estimating ego-motion for a video scene having remarkable periodic features. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram for n, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a. "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a list of cited references is provided. Next, a description of the various principal aspects of the present invention is provided. Finally, specific details of various embodiment of the present invention are provided to give an understanding of the specific aspects.

(1) LIST OF INCORPORATED LITERATURE REFERENCES

The following references are cited and incorporated throughout this application. For clarity and convenience, the references are listed herein as a central resource for the reader. The following references are hereby incorporated by reference as though fully set forth herein. The references are cited in the application by referring to the corresponding literature reference number, as follows:

1. N. Srinivasa et al., "Probabilistic inference devices for unconventional processing of signals for intelligent data exploitation," in Proc. GOMACTech 2015, March 2015.
2, H. Badino and T. Kanade, "A Head-Wearable Short-Baseline Stereo System for the Simultaneous Estimation of Structure and Motion," in Proc. 12th IAPR Conference on Machine Vision Applications (MVA), June 2011.
3. Y. Cheng, M. Maimone, and L. Matthies, "Visual odometry on the Mars exploration rovers," in IEEE International Conference on Systems, Man and Cybernetics, vol. 1, pp. 903-910, 2005.
4. C. R. del-Blanco, F. Jaureguizar, L. Salgado, and N. Garcia, "Motion estimation through efficient matching of a reduced number of reliable singular points" in Proc, SPEI Electronic imaging 2008,vol. 6811, pp. 68110N 1-12, 2008.
5. B. K. Horn and B. G. Schunck, "Determining optical flow," Artificial Intelligence, vol. 17, pp. 185-203, 1981.
6. B. D. Lucas and T. Kanade, "An iterative image registration technique with an application to stereo vision," in Proc. $7^{th}$ International Joint Conference on Artificial Intelligence (IJCAI), vol. 81, pp. 674-679, 1981.
7. X. Ren, "Local grouping for optical flow," in Proc. IEEE Conference on Computer Vision and Pattern Recognition (CVPR '08), 2008.
8. M. A. Fischler and R. C. Bolles, "Random sample consensus: a paradigm for model fitting with applications to image analysis and automated cartography," Communications of the ACM, vol. 24, no. 6, pp. 381-395, 1981.
9. L. Itti, Neovision2 annotated video datasets. Taken on Apr. 18, 2017 from http://ilab.usc.edu/neo2/dataset/.

(2) Principal Aspects

Various embodiments of the invention include three "principal" aspects. The first is a system for estimating egomotion for a video scene. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory comp ter-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, application-specific integrated circuit (ASIC), programmable logic array (PLA), complex programmable logic device (CPLD), or a field programmable gate array (FPGA).

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EFPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system. 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data, bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
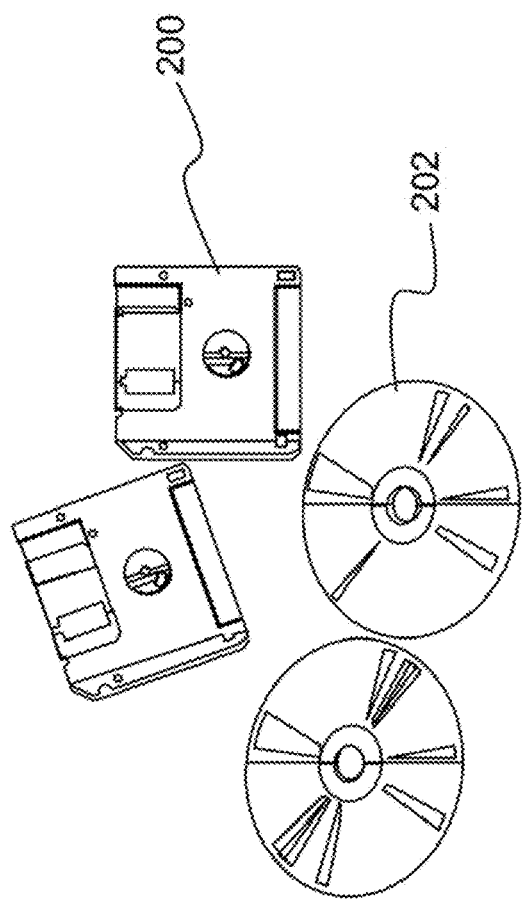
FIG. 2 is an illustration of a computer program product according to some embodiments of the present disclosure.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(3) Specific Details of Various Embodiments

With the advent of modern computers, sensors, and the internet, the amount of data being collected is far outpacing current capabilities of computing platforms to process them. This is further exacerbated for intelligence, reconnaissance and surveillance (ISR) applications where there is also a need for real-time processing of the large volume of data collected from computers on aerial vehicles such as unmanned aerial vehicles (UAVs), helicopters and satellites to enable fast situational awareness and response capabilities. Furthermore, Moore's law is beginning to stall, especially in power efficiency, significantly impacting the computation capabilities of these platforms. Hence, there is a great need for real-time processing of wide-area, high-resolution video imagery, with systems performing target recognition and tracking over large numbers of objects. Low-power emerging devices require fast and robust algorithms for on-board real-time processing of high-resolution video imagery captured from aerial vehicles to perform target recognition and tracking over large numbers of objects.

A key requirement for video processing from aerial vehicles is the need to compensate ego-motion of the vehicle in order to robustly detect all of the independent moving objects in the scene. Prevalent methods of estimating the ego-motion of a camera require feature detection and optical flow, where features are detected in the first frame, and then matched in the second frame (see Literature Reference Nos. 2-4 of the List of Incorporated Literature References). The matched features are then used to compute the optical flow field that provides an estimate of the camera motion (see Literature Reference Nos. 5-7). Although these methods are general purpose in nature where a camera is freely moving and rotating, they are highly computation-intensive. Furthermore, feature matching does not work well when there are independent moving objects in the scene. It results in moving outliers that have to be removed using a post-processing step (see Literature Reference No. 8) and this increases the computation cost.

In U.S. application Ser. No. 15/250,665, entitled, "A Fast Robust Method for Compensating Ego-Translations and Detecting Independent Moving Objects in Video Captured with a Moving Camera," (which is hereby incorporated by reference as though fully set forth herein), a fast alternate line search method was disclosed to address the problem. The alternate line search method is fast and efficient; on average, it takes only 8 frame-difference operations to find the correct ego-translation. Due to its computational efficiency, it is amenable for implementation in ultra-low power hardware systems (see Literature Reference No. 1). However, in some cases where there are remarkable periodic features (e.g. segment lane marks in a highway) in the scene, the cost function can have multiple local minima.

Figures 5A, 5B:
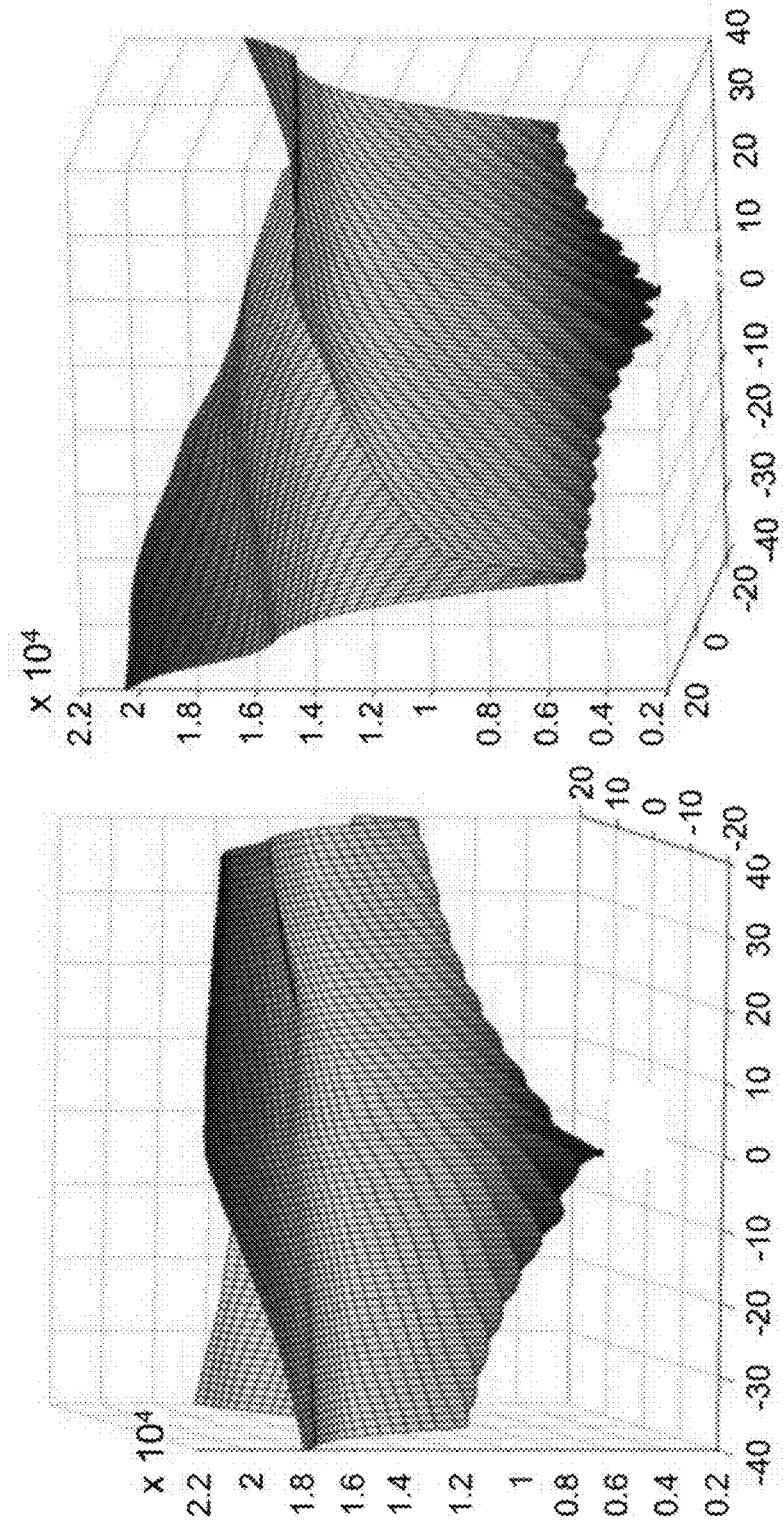
FIG. 5A is an illustration of a multiple local minima example according to some embodiments of the present disclosure.
FIG. 5B is another illustration of a multiple local minima example according to some embodiments of the present disclosure.

FIGS. 5A and 5B depict two plots of multiple local minima examples. Then, it is possible that the search is stuck at a local minimum if it starts from an initial point far from the global minimum. Notice in FIGS. 5A and 5B that the global minimum is usually deep and local minima are shallow. A solution to this is choosing a good initial point. In particular, for a helicopter video, the initial point can be estimated according to the moving direction and speed of the helicopter. Alternatively, one can choose several random initial points and then select the one that leads to the smallest solution. Once the optimal ego-translation has been estimated for the first frame pair, it can be used as the initial point for the next frame pair. Therefore, the initial point is only needed, to be estimated once at the first frame pair. For a whole video of many frames, this will only add negligible computational cost. This can normally work well if the camera has no abruptly fast unstable movement. However, the approach can fail if the camera keeps changing its moving direction in high speed from frame to frame on a scene where the cost function has multiple local minima.

Described herein is a unique valley search method to address the multiple local minima problem that is associated with periodic features (e.g., lights and scrolling advertisements, segmented lane marks in a highway) in a video scene. Below is a description of the alternate line search method followed by the valley search method according to embodiments of the present disclosure.

(3.1) Alternate Line Search (3.1.1) Cost Function Definition

Let I and I' be two consecutive frames in a video with planar ego-translations. In the ideal case, there are fixed translations h and v such that I'(i+h, j+v)=I(i,j) for any position (i,j). However, in practice, it rarely occurs due to independent object movement, small rotation and scaling, as well as noise. Instead, the optimal translation (h,v) is determined by minimizing the function $$f(h,v) = \Sigma_{ij} |I'(i+h,j+v) - I(i,j)|. \quad (1)$$

Here $|\cdot|$ is the absolute value, and (i,j) are valid positions (overlapping region of translated image and original image). In other words, the following problem is solved:

$$\min_{h,v} \sum_{ij} |I'(i+h, j+v) - I(i, j)|. \quad (2)$$

It should be noted that it is possible to replace the absolute value in the cost function by the square value. Then, the cost function will become differentiable at the global minimum, and, hence, many gradient-based optimization methods can be used. However, the square value requires more expensive multiplication operation.

(3.1.2) Fast Optimization Method

The fast optimization method described herein is simple, but robust, in obtaining an approximate estimate to the global minimum. The algorithm consists of alternate line searches on independent dimensions (horizontal or vertical). Starting from an initial point, it goes as far as possible in one direction (horizontal or vertical) until reaching a minimum in that direction. Then, starting from there, it goes as far as possible in the other direction (vertical or horizontal). The process can be repeated until no movements in both directions are possible. For example, for an elliptic paraboloid it takes only two steps to reach the global minimum starting from any initial point.

Mathematically, let $(h_0, v_0)$ be the initial point. Here, (h,v) represents a pixel with horizontal (h) and vertical (v) coordinates. The algorithm then proceeds as follows.

1. Find $h_1$ such that $$\min_h f(h, v_0) \text{ at } h = h_1.$$

at $h = h_1$.

2. Find $v_1$ such that $$\min_v f(h_1, v) \text{ at } v = v_1.$$

at $v = v_1$.

3. Let $\Delta h = |h_1 - h_0|$, $\Delta v = |v_1 - v_0|$, then reset $h_0 \leftarrow h_1$ and $v_0 \leftarrow v_1$.

4. Repeat steps 1-3 until $\Delta h$ and $\Delta v$ are zeros (or small enough).

Figure 3:
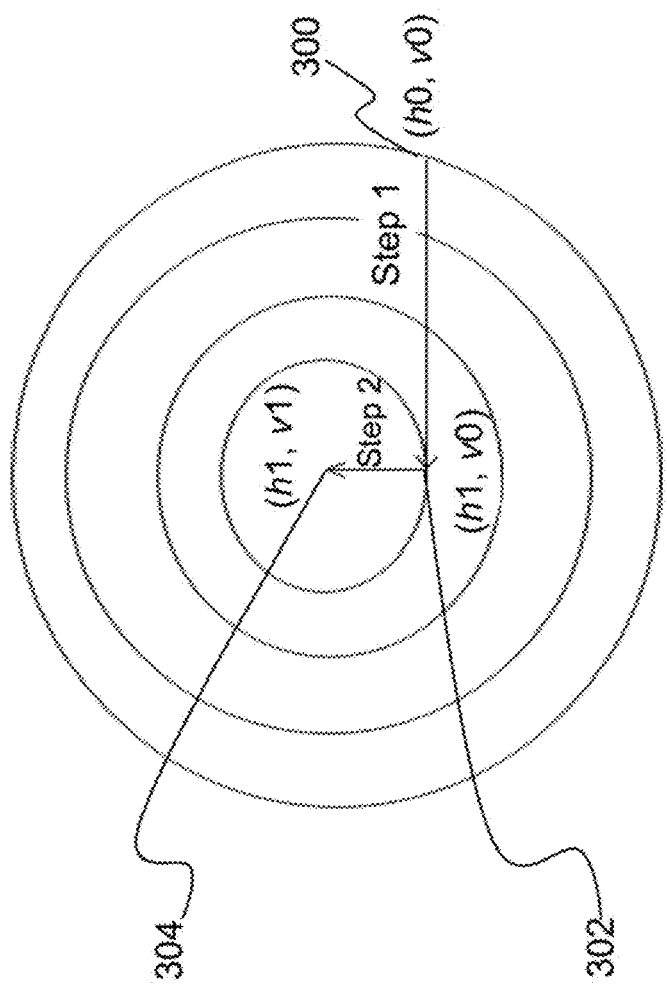
FIG. 3 is an illustration of an alternate line search method according to some embodiments of the present disclosure.

FIG. 3 is an illustration of the alternate line search method on the contour plot of an elliptic paraboloid. $(h_0, v_0)$ 300 is the initial point, $(h_1, v_0)$ 302 is determined after Step 1, and $(h_1, v_1)$ 304 is determined after Step 2 of the alternate line search method. By testing in the simulations on the Defense Advanced Research Projects Agency (DARPA) helicopter videos (see Literature Reference No. 9), it usually takes no more than three line searches to reach the global minimum. In the next subsection, the one-dimensional line search method used in Steps 1 and 2 of the above algorithm is described.

(3.1.2.1) Line Search Algorithm

FIG. 4 illustrates a line search algorithm on a horizontal direction where d(h) is the function to be minimized. In FIG. 4, L, B, and H represent initial guesses of translation (in units of pixels). The only requirement is that d(B)≤d(L) and d(B)≤d(H). L' and B' are then computed as described above. Vertical directional line search is similar. Let $g(h) = f(h + h_0, v_0)$, where $(h_0, v_0)$ is the initial position.

1. Determine the side of search direction (left or right). It can be done by choosing the smallest among $g(\Delta h)$, $g(-\Delta h)$ and $g(0)$, with $\Delta h$ being a small number (e.g., 1 or 2). Let h<0 denote the left and h>0 denote the right. If $g(0)$ is the smallest, then stop and return h=0. Otherwise, let d(h) be g(h) if $g(\Delta h)$ is the smallest; or $g(-h)$ if $g(-\Delta h)$ is the smallest.

2. Initialize L, B and H such that d(B)≤d(L) and d(B)≤d(H). This can be done as follows. Let L=0, B=Δh, and H=2B. Repeat B←H and H←2B until d(B)≤d(H).

3. If H−L>2, then repeat:

3.1. Let $L' = \lfloor \frac{L+B}{2} \rfloor, H' = \lfloor \frac{H+B}{2} \rfloor$.

Here $\lfloor \cdot \rfloor$ is the floor function.

3.2. If d(L')<d(B), then reset H←B, and B←L'.

3.3. If d(H')<d(B), then reset L←B, and B←H'.

3.4. Otherwise, reset L←L', and H←H'.

4. Return h=B as the optimal directional search result.

It should be noted that in the above algorithm, all line search sizes are integers. As a result, it does not require subpixel image transform. This will save the computation cost of doing image interpolation.

(3.2) Valley Search

This section introduces the valley search method according to embodiments of the present disclosure. As aforementioned, the alternate line search can fail to reach the global minimum in case the cost function has multiple local minima. Since the local minima are often distributed along a valley (such as the example plots shown in FIGS. 5A and 5S), a solution is to perform a line search along the valley direction. This can be implemented by first locating two local minima, and then searching along the direction defined by the two local, minima. The two local mini ma can be found using an optimization method described in previous sections (e.g., the alternate line search method), by starting from two initial points that are sufficiently far from each other. FIGS. 5A and 5B show a typical cost function surface with several local minima, where the x-axis represents pixels, and the y-axis represents cost function values. The color scale is such that blues and reds denote low to high values, respectively, and greens and yellows represent middle values.

FIGS. 6A and 6B depict the valley search method according to embodiments of the present disclosure. FIG. 6A is a surface plot of data from a video scene, and FIG. 6B is a contour plot of the surface data in the form of contour lines. In FIG. 6A, the x-axis represents pixels, and the y-axis represents cost function values. The color scale is such that blues and reds denote low to high values, respectively, and greens and yellows represent middle values. The contour colors (FIG. 6B) represent the surface plot (FIG. 6A) values. The stars denote two local minima (elements 600 and 602) in each plot. The arrows 604 represent the valley search direction defined by the two local minima. More precisely, the algorithm is described as follows.

(3.2.1) Valley Search Algorithm
1. Starting from an initial point $(h_0, v_0)$, use the alternate line search method to get an ego-translation estimate $(h_1, v_1)$.
2. Pick up another initial point $(h'_0, v'_0)$ that is sufficiently far from $(h_0, v_0)$. For example, a sufficient offset from $(h_1, v_1)$ such as $h'_0 = h'_1$ and $v'_0 = v_1 + 5$. Then starting from the initial point $(h'_0, v'_0)$, using the alternate line search method to get another ego-translation estimate $(h_2, v_2)$.
3. If $(h_2, v_2) = (h_1, v_1)$, stop and return $(h_2, v_2)$ as the optimal solution. Otherwise, find the smaller value of $f(h_1, v_1)$ and $f(h_2, v_2)$, where f is the cost function defined by Equation 1. Assume $(h_2, v_2)$ is the smaller solution. Swap $(h_1, v_1)$ and $(h_2, v_2)$ otherwise.
4. Repeat until $h_2 = h_1$ and $v_2 = v_1$.
   i. Let $r = (h_2 - h_1, v_2 - v_1)$, and $x_0 = (h_1, v_1)$. Define $d(u) = f(x_0 + ru)$.
   ii. Perform a line search to function d such that $\alpha = \text{linesearch}(d, \Delta, \varepsilon_1)$. Here linesearch is the algorithm defined above, with $\Delta = 1$ and $$\varepsilon_1 = \min\left(\left|\frac{1}{h_2 - h_1}\right|, \left|\frac{1}{v_2 - v_1}\right|\right).$$

iii. Let $(h,v) = \text{round}(x_0 + r\alpha)$, where the round function rounds its arguments to the nearest whole numbers. Then, starting from $(h,v)$, use the alternate line search method to get an second or third ego-translation estimate $(h', v')$,
   iv. Reset $(h_1, v_1) = (h_2, v_2)$ and $(h_2, v_2) = (h', v')$.
5. Return $(h_2, v_2)$ as the optimal solution.

(3.3) Experimental Studies

The valley search method according to embodiments of the present disclosure was tested on DARPA helicopter videos (see Literature Reference No. 9). FIGS. 7A-7C show results of the test. FIG. 7A illustrates a video image frame in a helicopter video where the camera keeps changing its moving direction in high speed. FIG. 7B depicts a warped frame difference after compensating the ego-translation that is obtained by using the alternate line search method alone. The alternate line search algorithm to compute the ego-motion gave or got stuck in a local minimum solution instead of finding a global minima. The tree 700 and building 702 are incorrectly detected as moving object pixels. FIG. 7C depicts a warped frame difference after compensating the ego-translation that is obtained by using the valley search method according to the invention. The global minimum is reached, as described in section (3.2.1). When the algorithm converges $(h_2 = h_1, v_2 = v_1)$, it exits with $(h_2, v_2)$ as the optimal solution.

Figure 8B:
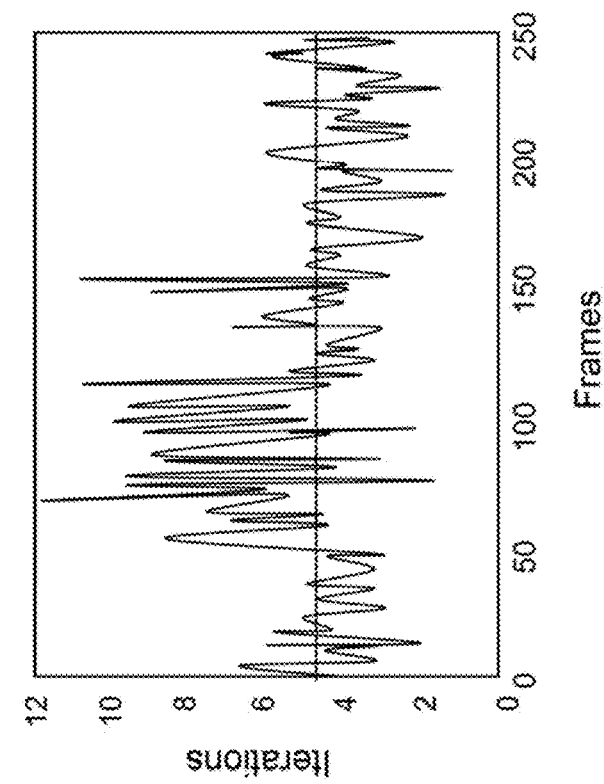
FIG. 8B is a plot illustrating number of line searches (iterations) used in simulation of the valley search algorithm according to some embodiments of the present disclosure.
Figure 8A:
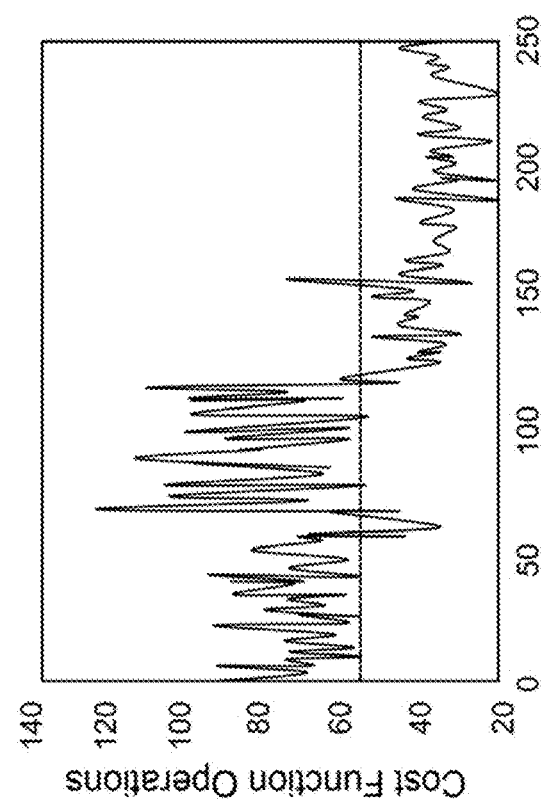
FIG. 8A is a plot illustrating numbers of cost function operations that measure the computation cost in simulation of the valley search algorithm according to some embodiments of the present disclosure.
Figures 8C, 8D:
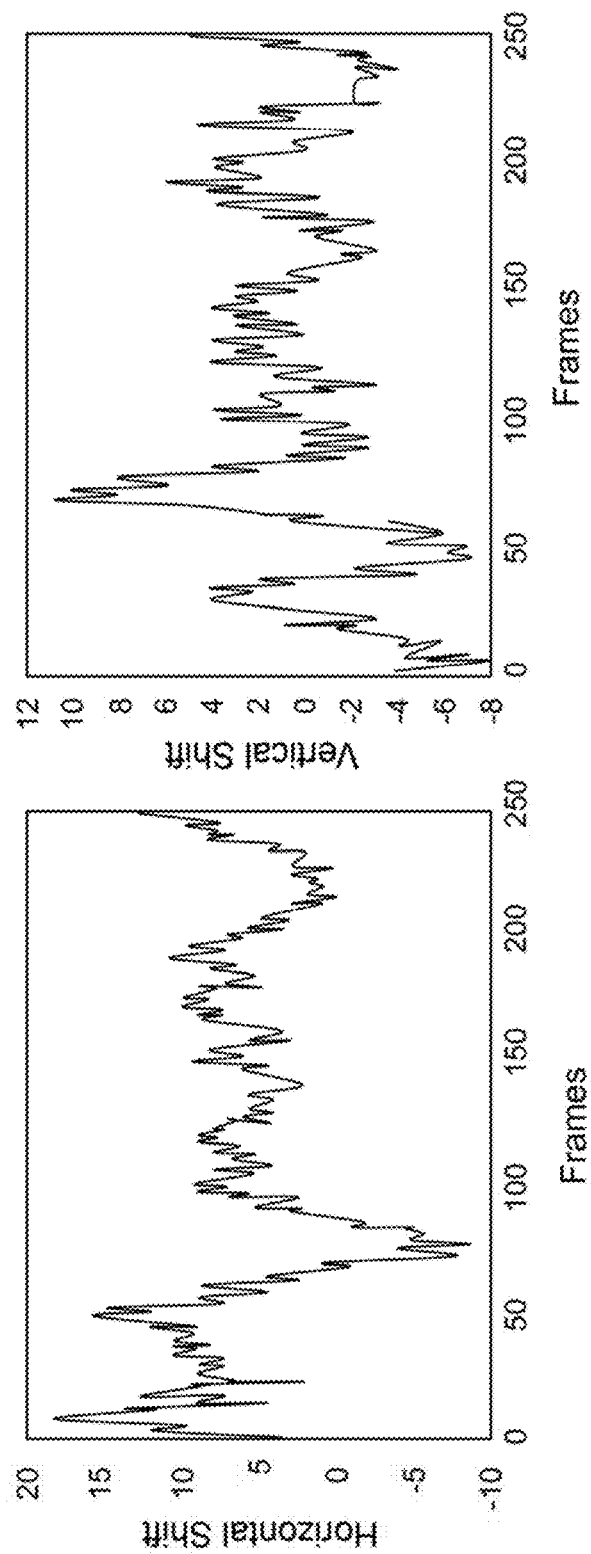
FIG. 8C is a plot illustrating estimated horizontal shift that varies with frame in simulation of the valley search algorithm according to some embodiments of the present disclosure.
FIG. 8D is a plot illustrating estimated vertical shift that varies with frame in simulation of the valley search algorithm according to some embodiments of the present disclosure.
Figure 8E:
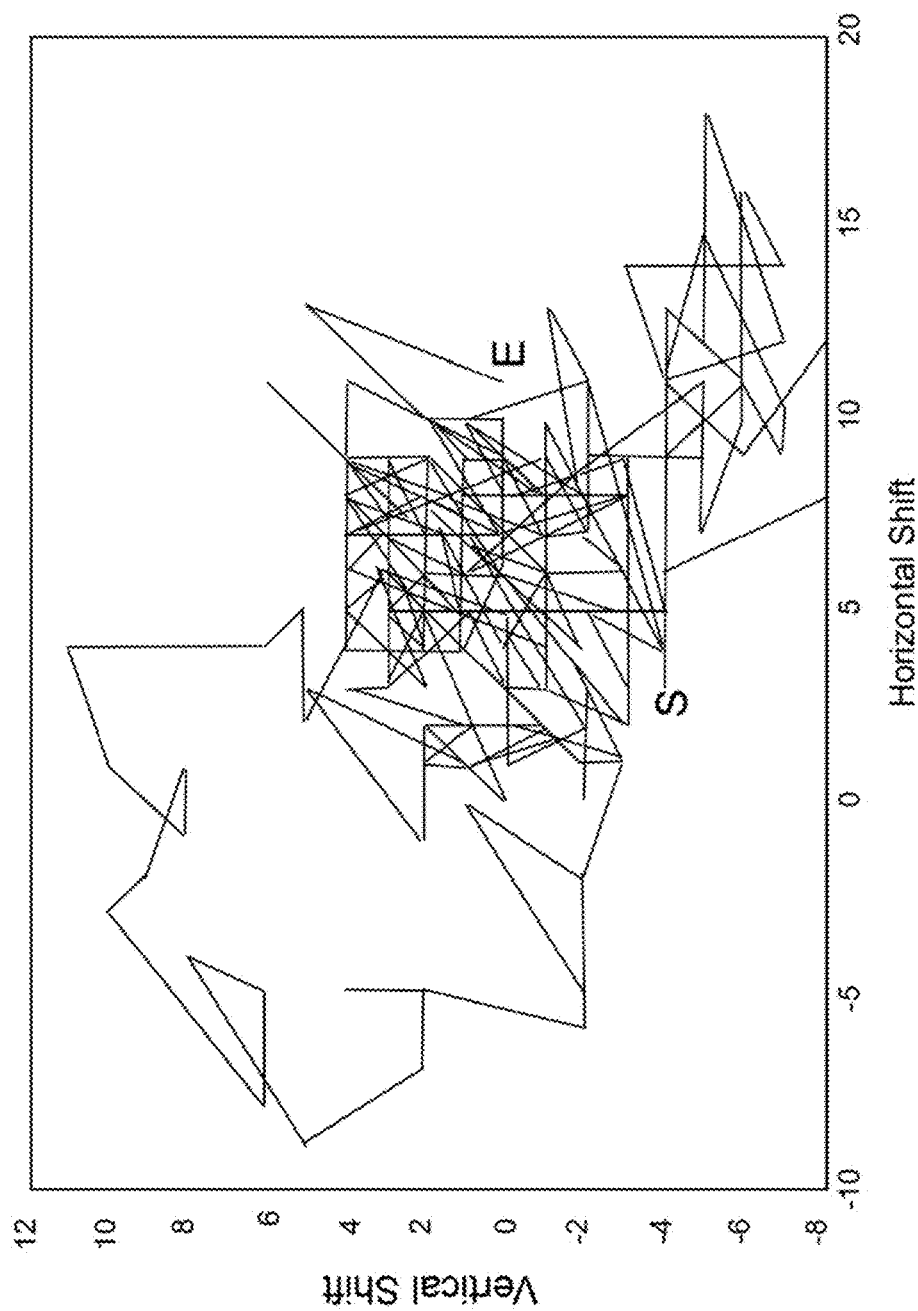
FIG. 8E illustrates estimated camera ego-translations that plot in horizontal and vertical shifts in place according to some embodiments of the present disclosure.

Additionally, the valley search method was tested on videos with many flames in the DARPA helicopter dataset. In particular, FIGS. 8A-SE show the simulation result of the algorithm on a video sequence of 250 frames with image size 256×512. The average computational cost was 54.8 operations of cost function for each frame pair, with 4.8 line searches (see the plots in FIGS. 8A and 8B). FIG. 8A is a plot illustrating numbers of cost function operations that measure the computational cost. The dashed line denotes the mean value of 54.8. FIG. 8B is a plot depicting the number of line searches (iterations) used, it can be seen from the plots in FIGS. 8C-8E that there are large changes in direction and speed of the camera motion from frame to frame in the video sequence. FIG. 8C is a plot showing estimated horizontal shifts that vary with frame, FIG. 8D is a plot showing estimated vertical shifts that vary with frame. Large changes in direction and speed of camera motion from frame to frame are shown. FIG. 8E depicts estimated ego-translations that plot in horizontal and vertical shift planes. S is the start frame, and E is the end frame. The simulations show that the valley search method according to embodiments of this disclosure performs better than the alternate line search method in the complex case where the video scene has remarkable periodic features, such as segmented lane marks in a highway.

Figure 9:
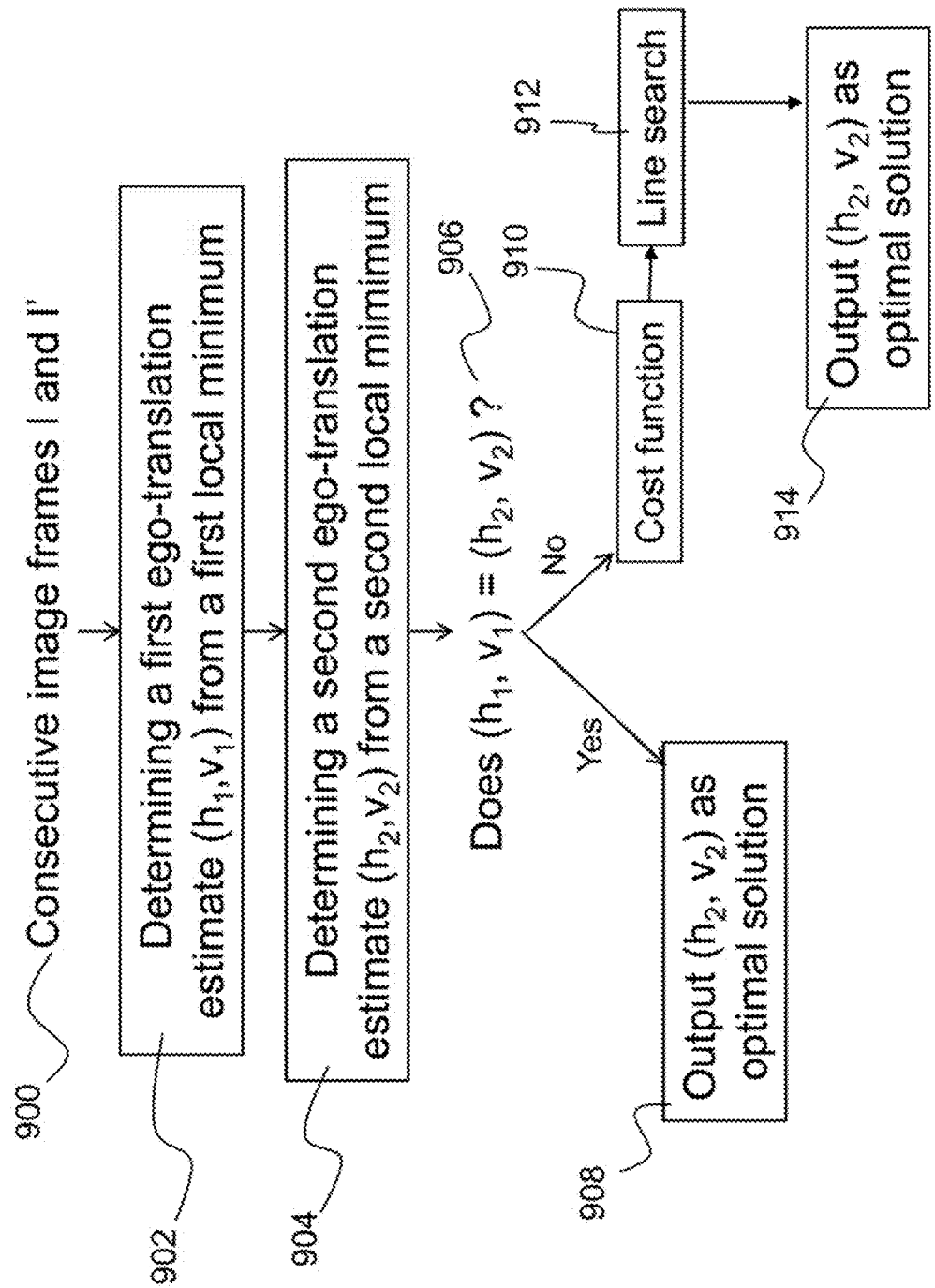
FIG. 9 is a flow diagram illustrating the system for estimating ego-motion of a video scene according to some embodiments of the present disclosure.

FIG. 9 is a flow diagram depicting the system described herein. As described above, from consecutive image frames of a video 900, in a first operation 902, a first ego-translation is estimated from a first local minimum. In a second operation 904, a second ego-translation is estimated from a second local minimum. A determination is made regarding whether $(h_2, v_2) = (h_1, v_1)$ (element 906), and $(h_2, v_2)$ is returned as the optimal solution. Otherwise, find the smaller value of $f(h_1, v_1)$ and $f(h_2, v_2)$, where f is the cost function (element 910) defined by Equation 1. A line search algorithm (element 912) is performed, as described above, until $h_2 = h_1$ and $v_2 = v_1$. Then, $(h_2, v_2)$ is returned as the optimal solution (element 914). The optimal solution $(h_2, v_2)$ indicates the ego-motion. Suppose $h_2 = 2, v_2 = 3$. This means that the platform moved two and three pixels in the horizontal and vertical directions, respectively, in the time between two frames. If the video is 30 frames per second (sec), then this means its horizontal speed=2*(1/30) pixels/sec and vertical speed=3*(1/30 pixels/sec. From the optimal solution, the frames are shifted (warped) based on ego-motion such that difference can be performed. Only the true moving objects will then stand out and display as detected objects (as shown in FIG. 7C).

The invention described herein has a wide range of applications in image and video processing where the dominant ego-motion is translation, such as helicopter, unmanned aerial vehicle (UAV), and satellite videos. For example, intelligence surveillance, and reconnaissance (ISR) operation use UAV or Argus-IR (infrared) types of sensor platforms. Once objects are detected, one can classify the objects (e.g., car, person) and/or track the objects using any standard tracking algorithm (e.g., mean-shift tracker).

Finally, while this invention has been described in terms of several embodiments, one of ordinary skill in the art will readily recognize that the invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Further, while particular method steps have been recited in a particular order, the method steps may occur in any desired order and fall within the scope of the present invention.

What is claimed is:

1. A system for estimating ego-motion from video scenes, the system comprising:
one or more processors and a non-transitory computer-readable medium having executable instructions encoded thereon such that when executed, the one or more processors perform operations of:
for consecutive frames in a video captured by a moving camera, determining a first ego-translation estimate between the consecutive frames from a first local minimum $(h_0, v_0)$;
determining a second ego-translation estimate from a second local minimum $(h'_0, v'_0)$;
if the second ego-translation estimate does not equal the first ego-translation estimate, determining an optimal solution by minimizing a cost function until the first ego-translation estimate and the second ego-translation estimate are a matching estimate;
estimating ego-motion of the camera using the optimal solution; and
detecting independent moving objects in the video after compensating for ego-motion of the camera.

2. The system as set forth in claim 1, wherein the cost function to be minimized is $f(h,v)=\Sigma_{ij}|I'(i+h,j+v)-I(i,j)|$, where $|\cdot|$ is an absolute value, $(i,j)$ are pixel positions in an overlapping region of consecutive frames I and I', h represents a horizontal shift between I and I', and v represents a vertical shift between I and I'.

3. The system as set forth in claim 1, wherein the first ego-translation $(h_1, v_1)$ and the second ego-translation $(h_2, v_2)$ are determined using an alternate line search method according to the following:
(a) determining $h_1$ such that $$\min_h f(h, v_0) \text{ at } h = h_1;$$

at $h=h_1$;
(b) determining $v_1$ such that $$\min_v f(h_1, v) \text{ at } v = v_1;$$

at $v=v_1$;
(c) Let $\Delta h=|h_1-h_0|$, $\Delta v=|v_1-v_0|$, then resetting $h_0 \leftarrow h_1$ and $v_0 \leftarrow v_1$, wherein $\Delta h=|h_1-h_0|$ represents a difference between initial horizontal pixel values in an initial frame $h_0$ and shifted horizontal pixel values in a consecutive frame $h_1$, and wherein $\Delta v=|v_1-v_0|$ represents a difference between initial vertical pixel values in an initial frame $v_0$ and shifted vertical pixel values in a consecutive frame $v_1$;
(d) repeating (a) through (c) until $\Delta h$ and $\Delta v$ are zeros or less than one pixel.

4. The system as set forth in claim 1, wherein the one or more processors further perform operations of:
determining $d(u)=f(x_0+ru)$, where $r=(h_2-h_1, v_2-v_1)$, and $x_0=(h_1, v_1)$, where d is a function to be minimized and a is a normalized value;
performing a line search method to function d such that $\alpha=\text{linesearch}(d, \Delta, \varepsilon_1)$, where $\Delta=1$ and $$\varepsilon_1 = \min\left(\left|\frac{1}{h_2-h_1}\right|, \left|\frac{1}{v_2-v_1}\right|\right);$$

using an alternate line search method to determine an ego-translation estimate (h',v') starting from (h,v), wherein $(h,v)=\text{round}(x_0+r\alpha)$, where the round function acts to round to a nearest whole number; and
resetting $(h_1,v_1)=(h_2,v_2)$ and $(h_2,v_2)=(h',v')$.

5. The system as set forth in claim 1, wherein the cost function to be minimized is based on differences between initial pixel values in an initial frame and shifted pixel values in a consecutive frame.

6. The system as set forth in claim 1, wherein the first ego-translation and the second ego-translation are determined using an alternate line search method.

7. The system as set forth in claim 1, wherein the one or more processors further perform operations of:
performing a line search method to a function based on the first ego-translation estimate in combination with a scaled difference between the first ego-translation estimate and the second ego-translation estimate;
using an alternate line search method to determine a third ego-translation estimate by starting from a position determined using a round function; and
resetting the second ego-translation estimate equal to the results of the alternate line search method based on the third ego-translation estimate.

8. A computer implemented method for estimating ego-motion from video scenes, the method comprising an act of:
causing one or more processers to execute instructions encoded on a non-transitory computer-readable medium, such that upon execution, the one or more processors perform operations of:
for consecutive frames in a video captured by a moving camera, determining a first ego-translation estimate between the consecutive frames from a first local minimum $(h_0, v_0)$;
determining a second ego-translation estimate from a second local minimum $(h'_0, v'_0)$;
if the second ego-translation estimate does not equal the first ego-translation estimate, determining an optimal solution by minimizing a cost function until the first ego-translation estimate and the second ego-translation estimate are a matching estimate;
estimating ego-motion of the camera using the optimal solution; and
detecting independent moving objects in the video after compensating for ego-motion of the camera.

9. The method as set forth in claim 8, wherein the cost function to be minimized is $f(h,v)=\Sigma_{ij}|I'(i+h,j+v)-I(i,j)|$, where $|\cdot|$ is an absolute value, $(i,j)$ are pixel positions in an overlapping region of consecutive frames I and I', h represents a horizontal shift between I and I', and v represents a vertical shift between I and I'.

10. The method as set forth in claim 8, wherein the first ego-translation estimate $(h_1,v_1)$ and the second ego-translation estimate $(h_2,v_2)$ are determined using an alternate line search method according to the following:

(a) determining $h_1$ such that $$\min_h f(h, v_0) \text{ at } h = h_1;$$

at $h=h_1$;

(b) determining $v_1$ such that $$\min_v f(h_1, v) \text{ at } v = v_1;$$

at $v=v_1$;

(c) Let $\Delta h=|h_1-h_0|$, $\Delta v=|v_1-v_0|$, then resetting $h_0 \leftarrow h_1$ and $v_0 \leftarrow v_1$, wherein $\Delta h=|h_1-h_0|$ represents a difference between initial horizontal pixel values in an initial frame $h_0$ and shifted horizontal pixel values in a consecutive frame $h_1$, and wherein $\Delta v=|v_1-v_0|$ represents a difference between initial vertical pixel values in an initial frame $v_0$ and shifted vertical pixel values in a consecutive frame $v_1$;

(d) repeating (a) through (c) until $\Delta h$ and $\Delta v$ are zeros or less than one pixel.

11. The method as set forth in claim 8, wherein the one or more processors further perform operations of:

determining $d(u)=f(x_0+ru)$, where $r=(h_2-h_1,v_2-v_1)$, and $x_0=(h_1,v_1)$, where d is a function to be minimized and u is a normalized value;

performing a line search method to function d such that that $\alpha=\text{linesearch}(d, \Delta, \varepsilon_1)$, where $\Delta=1$ and $$\varepsilon_1 = \min\left(\left|\frac{1}{h_2 - h_1}\right|, \left|\frac{1}{v_2 - v_1}\right|\right);$$

using an alternate line search method to determine an ego-translation estimate (h',v') starting from (h,v), wherein $(h,v)=\text{round}(x_0+r\alpha)$, where the round function acts to round to a nearest whole number; and resetting $(h_1,v_1)=(h_2,v_2)$ and $(h_2,v_2)=(h',v')$.

12. The method as set forth in claim 8, wherein the cost function to be minimized is based on differences between initial pixel values in an initial frame and shifted pixel values in a consecutive frame.

13. The method as set forth in claim 8, wherein the first ego-translation and the second ego-translation are determined using an alternate line search method.

14. The method as set forth in claim 8, wherein the one or more processors further perform operations of:

performing a line search method to a function based on the first ego-translation estimate in combination with a scaled difference between the first ego-translation estimate and the second ego-translation estimate;

using an alternate line search method to determine a third ego-translation estimate by starting from a position determined using a round function; and resetting the second ego-translation estimate equal to the results of the alternate line search method based on the third ego-translation estimate.

15. A computer program product for estimating ego-motion from video scenes, the computer program product comprising:

computer-readable instructions stored on a non-transitory computer-readable medium that are executable by a computer having one or more processors for causing the processor to perform operations of:

for consecutive frames in a video captured by a moving camera, determining a first ego-translation estimate between the consecutive frames from a first local minimum $(h_0,v_0)$;

determining a second ego-translation estimate from a second local minimum $(h'_0,v'_0)$;

if the second ego-translation estimate does not equal the first ego-translation estimate, determining an optimal solution by minimizing a cost function until the first ego-translation estimate and the second ego-translation estimate are a matching estimate;

estimating ego-motion of the camera using the optimal solution; and detecting independent moving objects in the video after compensating for ego-motion of the camera.

16. The computer program product as set forth in claim 15, wherein the cost function to be minimized is $f(h,v)=\Sigma_{ij}|I'(i+h, j+v)-I(i,j)|$, where $|\cdot|$ is an absolute value, (i,j) are pixel positions in an overlapping region of consecutive frames I and I', h represents a horizontal shift between I and I', and v represents a vertical shift between I and I'.

17. The computer program product as set forth in claim 15, wherein the first ego-translation $(h_1,v_1)$ and the second ego-translation $(h_2,v_2)$ are determined using an alternate line search method according to the following:

(a) determining $h_1$ such that $$\min_h f(h, v_0) \text{ at } h = h_1;$$

at $h=h_1$;

(b) determining $v_1$ such that $$\min_v f(h_1, v) \text{ at } v = v_1;$$

at $v=v_1$;

(c) Let $\Delta h=|h_1-h_0|$, $\Delta v=|v_1-v_0|$, then resetting $h_0 \leftarrow h_1$ and $v_0 \leftarrow v_1$, wherein $\Delta h=|h_1-h_0|$ represents a difference between initial horizontal pixel values in an initial frame $h_0$ and shifted horizontal pixel values in a consecutive frame $h_1$, and wherein $\Delta v=|v_1-v_0|$ represents a difference between initial vertical pixel values in an initial frame $v_0$ and shifted vertical pixel values in a consecutive frame $v_1$;

(d) repeating (a) through (c) until $\Delta h$ and $\Delta v$ are zeros or less than one pixel.

18. The computer program product as set forth in claim 15, further comprising instructions for causing the one or more processors to further perform operations of:

determining $d(u)=f(x_0+ru)$, where $r=(h_2-h_1,v_2-v_1)$, and $x_0 (h_1,v_1)$, where d is a function to be minimized and u is a normalized value;

performing a line search method to function d such that that $\alpha=\text{linesearch}(d, \Delta, \varepsilon_1)$, where $\Delta=1$ and $$\varepsilon_1 = \min\left(\left|\frac{1}{h_2 - h_1}\right|, \left|\frac{1}{v_2 - v_1}\right|\right);$$

using an alternate line search method to determine an ego-translation estimate (h',v') starting from (h,v), wherein (h,v)=round($x_0$+rα), where the round function acts to round to a nearest whole number; and resetting ($h_1,v_1$)=($h_2,v_2$) and ($h_2,v_2$)=(h',v').

19. The computer program product as set forth in claim 15, wherein the cost function to be minimized is based on differences between initial pixel values in an initial frame and shifted pixel values in a consecutive frame.

20. The computer program product as set forth in claim 15, wherein the first ego-translation and the second ego-translation are determined using an alternate line search method.

21. The computer program product as set forth in claim 15, further comprising instructions for causing the one or more processors to further perform operations of:

performing a line search method to a function based on the first ego-translation estimate in combination with a scaled difference between the first ego-translation estimate and the second ego-translation estimate;

using an alternate line search method to determine a third ego-translation estimate by starting from a position determined using a round function; and resetting the second ego-translation estimate equal to the results of the alternate line search method based on the third ego-translation estimate.

\* \* \* \* \*